May 20, 1958  M. J. KRAMER  2,835,827
DIRECTIONAL TRANSDUCTOR SYSTEM
Filed Feb. 20, 1957
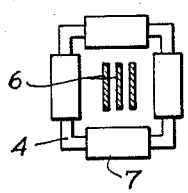
*Fig. 2.*
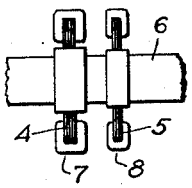
*Fig. 1.*
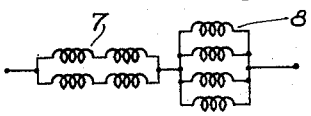
*Fig. 3.*
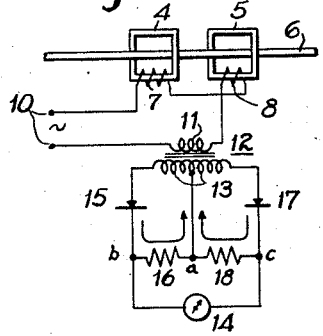
*Fig. 4.*
*Fig. 5.*
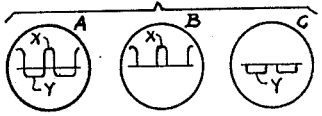
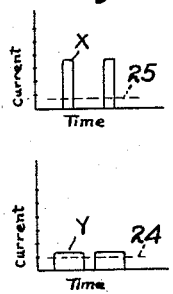
*Fig. 6.*
*Fig. 8.*
*Fig. 7.*
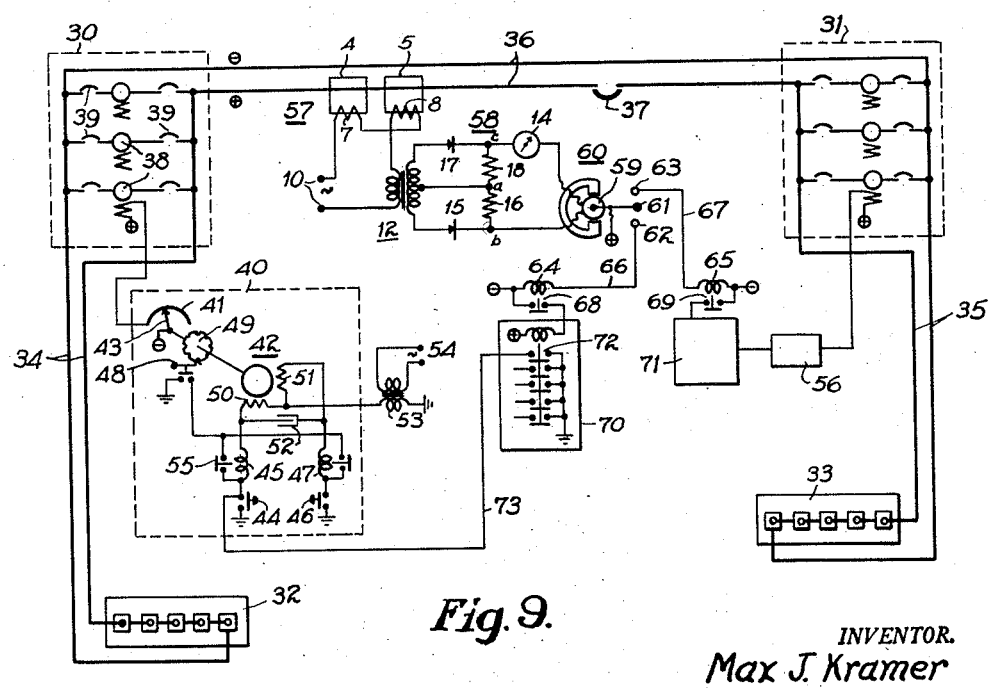
*Fig. 9.*
INVENTOR.
Max J. Kramer
BY
Howard B. Funk
ATTORNEY

United States Patent Office 2,835,827
Patented May 20, 1958

2,835,827

DIRECTIONAL TRANSDUCTOR SYSTEM

Max J. Kramer, Parma, Ohio, assignor to Aluminum Company of America, Pittsburgh, Pa., a corporation of Delaware Application February 20, 1957, Serial No. 641,327

6 Claims. (Cl. 307—57)

This invention relates to direct current responsive systems of the type which employ A. C. inductors, commonly referred to as saturable reactors, transductors or magnetic amplifiers, and it relates more particularly to systems of this type which are responsive to both the magnitude and polarity of the direct current input.

It is well known that the basic transductor is polarity insensitive, whereas polarity responsiveness is required for many metering and control applications. Heretofore, it has been necessary to employ duplicate transductor units and complex circuit arrangements to translate their outputs into opposite sense effects on metering or control elements, in order to render the system responsive to the direction of flow of the input control current. This entails added costs and complications.

The present invention has for its principal object to eliminate these prior art complications and provide polarity responsive metering and/or control with a single basic inductor unit in a simple circuit arrangement.

Another object of the invention is to provide a novel transductor unit producing an output current of asymmetrical or unbalanced wave form with characteristics dependent upon the magnitude and polarity of the direct current input.

A further object of the invention is to provide a simple protective system for a relatively low capacity tie bus interconnecting two high power feeder buses.

A further object of the invention is to provide a direct current polarity responsive system of the type above referred to which is of generally simplified and improved construction and of substantially linear characteristics over a relatively wide range of direct current magnitude.

The foregoing and other objects and features of the invention will become apparent from the following description when taken in conjunction with the accompanying drawing wherein particular embodiments are illustrated by way of example.

In the drawing:

Fig. 1 is a diagrammatic elevational view of a D. C. bus and a preferred form of distributed winding transductor, embodying certain features of the invention.

Fig. 2 is an end view thereof.

Fig. 3 is a schematic view showing a manner of connecting the coils of the transductor which may suitably be used.

Fig. 4 is a schematic diagram of apparatus and circuits embodying the invention for directional metering of the current flow in a D. C. conductor.

Fig. 5 shows reproductions of current wave patterns appearing on the screen of a cathode ray oscilloscope, as taken across different portions of the circuit of Fig. 4.

Figs. 6 and 7 are current versus time graphs illustrating the currents passing through the respective rectifier branches of the circuit of Fig. 4.

Fig. 8 is a schematic view showing a modified form of saturable reactor or transductor which may be employed.

Fig. 9 is a schematic diagram illustrating an embodiment of the invention in a tie bus protective system.

Referring now to Figs. 1, 2 and 4, there is shown a D. C. conductor or bus and a cooperating transductor in which the transductor comprises two closed magnetic cores 4 and 5 which, while shown as rectangular, may have other shapes, as desired. The bus 6 passes through the central area of each core and constitutes a single turn control winding therefor, to produce the saturating D. C. flux which passes through the cores. An alternating current winding 7 is provided on core 4 and a similar winding 8 is provided on core 5.

Each winding 7 and 8 may be divided so as to provide a distributed type winding on the respective cores, as shown in Figs. 1 and 2, in order that a desired ratio of D. C. to A. C. ampere turns may be had to limit the A. C. output to a reasonable maximum value when dealing with direct current of high amperage. As shown in Fig. 3, a series-parallel connection for the sections of winding 7 and a parallel connection for the sections of winding 8 may suitably be used, and such windings may be connected in series or in parallel; but in either case, windings 7 and 8 need be connected in opposition or reverse polarity relation with respect to each other in accordance with established principles of operation of simple series connected transductors. The windings are connected for energization from a suitable A. C. source 10 (Fig. 4), and in series in this circuit is the primary 11 of a current transformer 12 having a center-tapped secondary winding 13.

Transformer 12 feeds a balanced two-sided rectifier circuit for actuating a polarity sensitive, electro-responsive element of any suitable type, such as a zero center meter 14. One branch of this circuit suitably comprises rectifier 15 and resistance 16 in series and the other branch comprises rectifier 17 and resistance 18 in series, the midpoint of secondary 13 being connected to common point $a$ between the resistance elements 16 and 18. Meter 14 is shunted across the series connected resistances at the junction points $b$ and $c$. The rectifiers or asymmetrical conducting devices 15 and 17 are suitably of the metallic type, preferably copper-oxide rectifiers, and are electrically opposed so that the currents in the respective branch circuits are in the directions indicated by the arrows. It will be apparent that rectifier 15 passes positive-going half cycle current and rectifier 17 passes negative-going half cycle current.

Heretofore, it has been the custom and fixed practice to make the A. C. windings of direct current responsive inductor devices of the same number of turns. Such structures inherently have a D. C. input and an A. C. output in the various forms they may take in respect of the cores and windings employed. The two-core form above described is but one type and another well known type is illustrated in Fig. 8. It has a three-leg core with a D. C. input or control winding 20 on its center leg and A. C. output or controlled windings 21 and 22 on its outer legs for reverse polarity energization from an A. C. source. It is a well known characteristic of these devices that polarity of output is independent of input and, hence, a reversal of the input does not effect a reversal of the output. In other words, the devices are polarity insensitive and consequently, inherently fail to identify and respond to the direction of flow of the input control current.

I have discovered that this limitation can be overcome in a simple manner, primarily by furnishing such devices with A. C. output windings of which one of them has a greatly dissimilar number of turns to that of the other winding, as indicated in Fig. 1, and effecting utilization of the output current through half wave rectifier circuits of which one suitable form has been described. It has been found that the turn ratio of the two unbalanced output windings or coils should range from approximately 2 to 1 to 6 to 1, the higher ratio range contributing to improved linearity of response for wide range of direct current input. Resulting from using unbalanced, series connected A. C. windings with a turn ratio of at least 2 to 1 and with direct current flowing in one direction in the input circuit 6, an output current of asymmetrical wave shape is produced, the form of which is shown at A in Fig. 5. The output current, it will be apparent, is a series of positive and negative polarity pulses of generally rectangular shape, each consisting of a high magnitude, short time current pulse X for one part of the current cycle, and a low magnitude, long time current pulse Y for the remaining period of the cycle. The same current wave pattern appears on the screen of an oscilloscope connected to points b and c of the rectifier circuits of Fig. 4, while B and C in Fig. 5 depict the current pulses appearing across points b—a and a—c, respectively, of Fig. 4. Desirably, in a two-core design, the core 5 carrying the winding with the lesser number of turns may have a core area less than that of core 4, as indicated in Fig. 2, in order to contribute to a maximum differential in the asymmetrical current output.

Before rectification, the average values of the two currents represented by the pulses X and Y are equal and opposite, but when passed through the transformer and rectifiers, they are found to have a difference which is proportional to the total root-mean-square of the current pulses. This is graphically illustrated in Figs. 6 and 7, wherein it is to be noted that the average value of the current through resistance 18, due to pulses Y, as indicated by dotted line 24, is measurably greater than that through resistance 16 due to pulses X, as indicated by dotted line 25. This holds for flow of direct current in one direction through the D. C. input circuit 6. The A. C. output current is proportional to the D. C. input and, as rectified, appears as a differential voltage across the resistances 16—18, which polarizes the circuit and provides for a current flow which is also proportional to the D. C. flow in conductor 6. Meter 14 is responsive to and compares the rectified average values of the asymmetrical positive and negative pulses and thereby indicates the direction, as well as the magnitude of the rectified currents. Upon reversal of the D. C. current through conductor 6, the pulse shapes X and Y interchange, resulting from which the currents in the two rectifier circuits do not reverse, but are exchanged, so that the current in 16 becomes the current in 18 and vice versa. This reverses the polarity of the millivolts across points b and c and hence across elements 16—18, thereby causing the zero-center meter 14 to reverse its reading.

Fig. 9 illustrates a practical application of the invention for tie bus protection in a D. C. power distributing system. Diagrammatically illustrated are two adjacent D. C. power stations 30 and 31, each adapted to feed power to its own load 32 and 33 through high capacity power bus circuits 34 and 35, respectively. A representative arrangement of this character is that employed in aluminum smelting plants in which each load may comprise a smelting pot line made up of a large number of smelting pots connected in series and each pot line provided with its own power station in which a large number of power supply units, such as rectifiers, converters or generators, are operated in parallel on a common bus to provide the exceedingly large blocks of D. C. power required for aluminum production. In order to provide for flexibility of operation, adjacent power station buses 34 and 35 are interconnected by a much lower capacity tie bus, as indicated at 36, so that a portion of the current may be delivered from either station to the pot line of the other station, as operating conditions may necessitate for full production. A circuit breaker 37 is provided in the positive side of the tie bus to enable the tie circuit to be opened and closed, at will.

Parallel operated generators 38 are here shown in station 30 and each is adapted to be connected to station bus 34 by means of circuit breakers 39. The station voltage may be controlled by any suitable conventional means, such as by a field regulating unit for each generator, only one such unit 40 being here shown diagrammatically to avoid complicating the drawing. It may comprise the usual field adjusting rheostat 41, driving motor 42 for the movable contact arm 43 thereof, manual motor control circuits, one having a "lower" push button switch 44 and a holding relay 45 and the other a "raise" push button switch 46 and a holding relay 47, together with a stop switch 48 actuated by a multi-lobe cam 49 rotatable with the contact arm 43. Motor 42 is illustrated as a capacitor run A.-C. motor having separate stator or field windings 50—51 and capacitor 52, capable of being run at slow speed in either direction, the direction depending on which motor field has ground applied to it directly through one of the selectively operated push button controlled circuits, A. C. energy being supplied to the common point of both windings through "grounded" transformer 53 from a source indicated at 54. The "ground" symbol is used to simplify the wiring diagram.

If push button switch 44 is depressed, the motor is excited to drive the rheostat arm 43 through only one contact or step to add resistance to the generator field circuit and thus decrease the generator output voltage. Holding relay 45 also is energized responsively to closure of switch 44 and closes its contacts 55 which are in series with stop switch 48 so that upon initial movement of contact arm 43, switch 48 closes and completes a shunt circuit around push switch 44. This shunt circuit keeps the motor fields energized, with field 51 connected in series with capacitor 52 by the circuitry and thus controlling direction of rotation, until the rheostat contact arm 43 reaches its next step or contact, whereupon cam 49 permits stop switch 48 to open, thus de-energizing relay 45 and the motor field circuit. The same operation results if the "raise" push switch 46 is depressed, the motor rotating in the opposite direction because capacitor 52 and motor field 50 are now in series, to drive contact arm 43 through one step to cut out resistance in the generator field circuit and thus increase the generator output voltage. The corresponding field regulating units for the other generators 38 may likewise be selectively operated to raise or lower their output voltages to the desired station voltage. Since these may be conventional, well known units, further description thereof is deemed unnecessary for understanding of the instant invention. Also, means of interconnecting the respective generators for load enqualization in accordance with conventional practice may be provided, such means not being shown as it forms no part of the present invention.

Power station 31 duplicates station 30 and likewise has its station voltage controlled by similar field regulating units for each of its generators; here again only one of such units being indicated at 56.

Mounted in inductive relation to positive conductor of the bus 36 is a two-core transductor unit 57 having unbalanced A. C. output windings feeding a two-sided rectifier circuit 58. The elements of unit 57 and circuit 58 correspond to those heretofore described in connection with Fig. 4 and for convenience are identified by like reference numerals in Fig. 9. Connected in series with meter 14 across the resistances 16 and 18 is the movable coil element 59 of a polarity responsive relay 60. Coil element 59 is disposed between the poles of a magnet and operates a contact arm 61, which coil and arm are normally biased to an intermediate position by means of light springs, not shown. Cooperative with contact arm 61 in opposite directions of movement thereof are fixed contacts 62 and 63, which may be adjustably fixed in position to vary the relay action sensitivity. Contacts 62 and 63 are connected in circuit with timing devices or relays 64 and 65, respectively, by conductors 66 and 67, and contacts 68 and 69 of these timing devices control energization and de-energization of multiple-pole or contact relays 70 and 71, respectively. Conventional + and − symbols are used to simplify the wiring diagram. The timing devices may be of any suitable type having bellows or cam operated contacts providing different time delay intervals to open and close repetitively so long as the relays are energized. The contacts of multiple-pole relay 70 correspond in number to the number of generators in station 30 and each is connected to one of the generator rheostat units so as to effect simultaneous operation of all generator rheostats in a direction to lower the station voltage upon energization of the multiple-pole relay 70. Thus, as illustrated, the set of contacts 72 of relay 70 is connected by conductor 73 to provide a ground circuit in shunt relation to the "lower" push button switch 44 of unit 40 and each of the other sets of contacts of relay 70 is similarly connected to one of the other rheostat units, so that responsively to energization of relay 70 all generator rheostat motors will be excited to drive their rheostat contact arms through one step and thereby lower the station voltage. In a similar manner, the contacts of multiple-pole relay 71 are connected to the generator rheostat units of power station 31 to lower the station voltage.

In operation, it may be assumed that tie breaker 37 is closed and generating conditions in one station are such that some of the current needed to operate its pot line or load is being delivered through the tie bus circuit 36 from the other station. Such power transfer may be needed under a condition of planned shut-down for maintenance, or of accidental failure, of some of the generating units of either station. The magnitude and direction of this current flow are reflected in asymmetrical pulse currents in the A. C. output circuit of transductor unit 57 of an average value proportional to the average value of the bus tie current. The asymmetrical pulse currents, upon rectification, as heretofore described, cause a voltage drop across points $b$ and $c$ of the rectifier circuit 58 and circulation of current in a given direction through meter 14 and coil 59 of relay 60, the value of which is proportional to the tie bus current. Meter 14 indicates the direction and magnitude of the tie bus current, while relay 60 responds idly thereto so long as such current remains within prescribed limits. The tie bus is customarily of relatively small current carrying capacity, for economy of installation, its capacity usually being restricted to about 15% of that of the main station buses, for example. Of course, it is adapted to carry momentary overloads, but carrying of excessive currents over prolonged periods is to be avoided. The presence of overload current in tie bus 36 causes polarity responsive relay 60 to close the circuit to either timing relay 64 or 65, depending on the direction of tie bus current.

Assuming the transfer current to be from station 30 to load 33 at an excessive value, polarity responsive relay 60 responds and closes contacts 61—62 thereby causing timing relay 64 to become energized. When its timing period expires, contacts 68 close to energize multiple-pole relay 70 momentarily. Closure of all the contacts of relay 70 causes pick-up of the holding relay 45 and excitation of motor 42 of all of the field rheostat units 40, thus driving each generator rheostat one step in the direction to decrease the station voltage, so that the bus tie current is reduced. If the one-step change in station voltage suffices to bring the current to prescribed level, the circuit returns to normal condition by opening of the contacts 61—62. If not, timing relay 64 remains energized and causes a repetition of the operation of the generator rheostat units through another step or button and this continues until the station voltage is lowered to the point that the tie bus current comes within the desired limits. The timing relay permits momentary overswings in bus tie current without initiating a voltage lowering operation. It is set, for example, for about 20 seconds delay and then cause the field rheostats to move through one step to drop the station voltage, wait about 20 seconds and then initiate another rheostat operation to further reduce the station voltage, as required.

In the same manner, if the tie bus current flow is from station 31 to load 32, the polarity of points $b$ and $c$ of the rectifier unit 58 is reversed thereby causing meter 14 to reverse its reading and polarity responsive relay 60 to operate in the reverse direction without closure of contacts 61—63 so long as the transfer current remains within the desired range. Should the operating conditions change so that the voltage of station 31 causes excessive current flow through the tie bus, contacts 61—63 of relay 60 close and operation of the generator rheostats units 56 of the generators of station 31 is effected to reduce the station voltage in the same manner as described in connection with voltage reduction for station 30.

Adjustment of the spacing of contacts 62—63 with respect to the central or mid-position of contact 61 permits the selection of the top level of current which it may be desired to have flow in either direction through the tie bus. The timing intervals of the timing devices 64 and 65 can be changed to alter the sensitivity of voltage regulating operation for both momentary and persisting bus tie overloads, as desired.

While several particular embodiments of the invention have been illustrated and described, various changes in the form and details of structure and circuits employed will be apparent to those skilled in the art and may be made without departing from the scope of the invention as pointed out in the appended claims.

What is claimed is:

1. A direct current controlled electromagnetic induction system responsive to the direction and magnitude of direct current flow, comprising magnetic core means having a direct current input winding and a pair of multiple turn alternating current output windings energized in reverse polarity relation from an alternating current source, to provide alternating current output proportional to direct current input, said pair of windings having a turn ratio of at least 2 to 1, whereby the alternating output current consists of positive and negative current pulses of asymmetrical wave form, a current transformer having its primary winding connected in series with said pair of windings and its secondary winding connected to feed a circuit having two branches, separate means connected in each of said branches, including a half-wave rectifier to pass in one branch said positive current pulses and in the other branch said negative current pulses, for producing a current difference between said branches proportional to the root-mean-square of the total current pulses in the current transformer primary, the polarity of said current difference being dependent on the direction of D. C. flow through said input winding, and polarity sensitive means connected across said two branches to be actuated in accordance with said current difference.

2. A direct current controlled electromagnetic induction system responsive to the direction and magnitude of direct current flow, comprising magnetic core means having a direct current input winding and a pair of multiple turn alternating current output windings energized in reverse polarity relation from an alternating current source, to provide alternating current output proportional to direct current input, said pair of windings having a turn ratio of at least 2 to 1, whereby the alternating output current consists of positive and negative current pulses of asymmetrical wave form, a current transformer having a primary winding connected in series with said pair of windings, and a center-tapped secondary winding, separate resistance elements connected in series at one end and to the center tap of said secondary winding, separate half-wave rectifiers respectively connected between the outer ends of said resistances elements and the outer ends of said secondary winding, said rectifiers being electrically opposed so as to pass said positive current pulses through one and said negative current pulses through the other of said resistance elements and provide a differential voltage drop thereacross with a polarity dependent on the direction of direct current flow through said input winding, and a plurality sensitive electro-responsive means connected across said resistance elements to be actuated in accordance with current flow due to said differential voltage drop.

3. A direct current controlled electromagnetic induction system responsive to the direction and magnitude of direct current flow, comprising magnetic core means having a direct current input winding and a pair of multiple turn alternating current output windings energized in reverse polarity relation from an alternating current source, to provide alternating current output proportional to direct current input, said pair of windings having a turn ratio of at least 2 to 1, whereby the alternating output current consists of positive and negative current pulses of asymmetrical wave form, reversal of the D. C. flow through said input winding causing exchange of the shape of said current pulses, a current transformer having a primary winding connected in series with said output windings and a secondary winding connected to feed a two-branch circuit, a half-wave metallic rectifier and a resistance connected in series in each branch circuit, said rectifiers being electrically opposed to pass in one branch said positive current pulses and in the other branch said negative current pulses and produce a differential voltage drop across said resistances in a direction dependent on the direction of current flow through said input winding, and polarity sensitive means connected across said resistances and responsive to the direction and magnitude of current flow due to said differential voltage drop.

4. In combination, an inductor comprising two closed cores of magnetic material and of different cross-sectional areas, a winding on each core, with the number of turns of the winding on the core of larger cross-section exceeding that of the winding on the core of smaller cross-section in at least a two to one ratio, a direct current conductor disposed in inductive relation to said two cores and adapted to carry direct current of variable magnitude and direction of flow, said windings being connected in series and in reverse polarity relation and energized from an A. C. source, to provide alternating current output proportional to the direct current flow through said conductor, said output current consisting of a high magnitude, short time duration positive current pulse for one part of each alternating current cycle and a low magnitude, long time negative current pulse for the remaining period of the cycle, for one direction of direct current flow and which pulses exchange in shape with direct current flow in the opposite direction, a current transformer having a primary winding connected in series with said windings and a secondary winding connected to feed a two-branch circuit, a half-wave metallic rectifier and a resistance connected in series in each branch circuit, said rectifiers being electrically opposed to pass in one branch said positive current pulses and in the other branch said negative current pulses and produce a differential voltage drop across said resistances in a direction dependent on the direction of current flow through said direct current conductor, and polarity sensitive means connected across said resistances and responsive to the direction and magnitude of current flow due to said differential voltage drop.

5. In combination, a first and a second D. C. power station, each having a plurality of power units supplying power to a main bus for delivering power to its own load, regulating means for each of said stations cooperative with said power units thereof to control the station voltage, a tie bus of lower capacity than and interconnecting said main power buses for flow of current from either of said stations to the load of the other station, a circuit breaker for opening and closing said tie bus, a pair of closed magnetic cores disposed in inductive relation to one side of said tie bus and provided with unbalanced windings thereon of at least a two to one turn ratio with respect to each other, means connecting said windings for energization in reverse polarity relation from an A. C. supply source, a current transformer connected in series with said windings, two circuits disposed to be energized from said transformer, a metallic half-wave rectifier and a circuit element connected in each of said two circuits, said rectifiers being electrically opposed to pass positive current pulses in one and negative current pulses in the other of said two circuits so as to polarize said circuits by the difference in average value of the pulse current flow through them, polarity responsive electromagnetic means connected across said circuit elements in said two circuits for actuation responsively to the difference in average current flow through them, said difference current varying in magnitude proportionally to the current flow in said tie bus and of selectively reversible polarity in dependence on the direction of current flow through said tie bus, and means connected to be selectively actuated by said electromagnetic means for operating said regulating means of either of said power stations to decrease the station voltage responsively to tie bus current flow in excess of a preselected value.

6. In combination, a first and a second D. C. power station, each having a plurality of power units supplying power to a main bus for delivering power to its own load, regulating means for each of said stations cooperative with said power units thereof to control the station voltage, a tie bus of lower capacity than and interconnecting said main power buses for flow of current from either of said stations to the load of the other station, a circuit breaker for opening and closing said tie bus, a pair of closed magnetic cores disposed in inductive relation to one side of said tie bus and provided with unbalanced windings thereon of at least a two to one turn ratio with respect to each other, means connecting said windings for energization in reverse polarity relation from an A. C. supply source, a current transformer connected in series with said windings, two circuits disposed to be energized from said transformer, a metallic half-wave rectifier and a circuit element connected in each of said two circuits, said rectifiers being electrically opposed to pass positive current pulses in one and negative current pulses in the other of said two circuits so as to polarize said circuits by the difference in average value of the pulse current flow through them, polarity responsive electromagnetic means connected across said circuit elements in said two circuits for actuation responsively to the difference in average current flow through them, said difference current varying in magnitude proportionately to the current flow in said tie bus and of selectively reversible polarity in dependence on the direction of current flow through said tie bus, and means connected to be selectively actuated by said electromagnetic means for operating said regulating means of either of said power stations to decrease the station voltage responsively to tie bus current flow in excess of a preselected value, said last-named means including timing means operable to permit tie bus overload current flow for a predetermined time period before operation of said regulating means is initiated.

No references cited